(12) United States Patent
Strashny

(10) Patent No.: US 12,731,921 B2
(45) Date of Patent: Sep. 8, 2026

(54) ELECTRICAL INTERFACE SYSTEM

(71) Applicant: Caterpillar Inc., Peoria, IL (US)

(72) Inventor: Igor Strashny, Tucson, AZ (US)

(73) Assignee: Caterpillar Inc., Peoria, IL (US)

( * ) Notice: Subject to any disclaimer, the term of this patent is extended or adjusted under 35 U.S.C. 154(b) by 446 days.

(21) Appl. No.: 18/525,201

(22) Filed: Nov. 30, 2023

(65) Prior Publication Data

US 2025/0183565 A1 Jun. 5, 2025

(51) Int. Cl.
*H01R 9/26* (2006.01)
*B60M 1/30* (2006.01)

(52) U.S. Cl.
CPC ............. *H01R 9/2675* (2013.01); *B60M 1/30* (2013.01); *H01R 9/2608* (2013.01)

(58) Field of Classification Search
CPC ...... B60L 5/38; B60L 5/10; B60L 5/08; B60L 5/06; H01R 9/26; H01R 9/2608; H01R 9/2675; B60M 1/30
USPC .................................................. 191/60.1, 59
See application file for complete search history.

(56) References Cited

U.S. PATENT DOCUMENTS 491,132 A * 2/1893 Perkins .................... B60M 1/30 191/21
945,502 A * 1/1910 Enequist .................. B60M 1/30 191/22 R
1,236,905 A * 8/1917 Brown et al. ............. B60L 5/10 191/78
3,847,087 A * 11/1974 Lichtenberg ............ B60L 13/10 310/90.5
3,880,264 A * 4/1975 Corkum ................... B60M 1/30 191/48
4,469,128 A * 9/1984 Petrimaux ............... F16K 11/22 137/554
9,234,600 B2 * 1/2016 Thiele ..................... B60T 17/04
9,622,370 B2 * 4/2017 Gehrke .................... H05K 7/10
11,196,193 B2 * 12/2021 Stolze ...................... H01R 9/26
11,683,901 B2 * 6/2023 De Carolis .......... H01R 9/2675 361/728
11,688,973 B2 * 6/2023 Strashny ............ H01R 13/6273 439/34
11,804,668 B2 * 10/2023 Strashny .............. H01R 13/501
11,855,379 B2 * 12/2023 Strashny ................... B60L 9/00
11,859,370 B2 * 1/2024 Strashny ................... B60L 9/00
11,881,653 B2 * 1/2024 Strashny ............ H01R 13/6315
(Continued)

FOREIGN PATENT DOCUMENTS

CN 103329357 A * 9/2013 ........... H01R 4/4816
CN 103415960 A * 11/2013 ........... H01R 13/514
(Continued)

*Primary Examiner* — S. Joseph Morano
*Assistant Examiner* — Maxwell L Meshaka
(74) *Attorney, Agent, or Firm* — Bookoff McAndrews PLLC

(57) ABSTRACT

An electrical interface system may include a base frame with a plurality of through holes and a plurality of conductor terminals. The plurality of conductor terminals each include a stationary piston, a fluid bag assembly, and a movable brush. The electrical interface system may also include a plurality of busbar assemblies each including at least one terminal hole aligned with at least one through hole of the base frame, wherein each of the plurality of through holes and aligned terminal holes receive a portion of an individual conductor terminal.

20 Claims, 7 Drawing Sheets

(56) References Cited

U.S. PATENT DOCUMENTS

| | | | | |
|---|---|---|---|---|
| 11,894,631 | B2 * | 2/2024 | Strashny | H01R 31/06 |
| 11,923,632 | B2 * | 3/2024 | Strashny | H01R 13/501 |
| 12,027,290 | B2 * | 7/2024 | Strashny | H01B 9/006 |
| 12,240,355 | B2 * | 3/2025 | Strashny | B60M 1/307 |
| 12,304,329 | B2 * | 5/2025 | Hendrickson | B60L 50/53 |
| 12,322,918 | B2 * | 6/2025 | Strashny | B60L 5/085 |
| 12,391,149 | B2 * | 8/2025 | Strashny | B60M 1/02 |
| 12,397,677 | B2 * | 8/2025 | Lane | G01R 19/2513 |
| 12,413,035 | B2 * | 9/2025 | Strashny | B60L 5/085 |
| 12,428,789 | B2 * | 9/2025 | Strashny | B60M 1/307 |
| 12,438,344 | B2 * | 10/2025 | Strashny | H02B 1/52 |
| 12,496,935 | B2 * | 12/2025 | Strashny | B60L 5/39 |
| 12,522,078 | B2 * | 1/2026 | Winckler | B60L 5/38 |
| 12,522,109 | B2 * | 1/2026 | Strashny | B60M 1/08 |
| 12,552,259 | B2 * | 2/2026 | Strashny | B60L 5/38 |
| 12,583,364 | B2 * | 3/2026 | Strashny | B60M 1/307 |
| 12,583,365 | B2 * | 3/2026 | Strashny | B60M 1/307 |
| 2013/0025712 | A1 * | 1/2013 | Thiele | H01H 71/08 137/540 |
| 2013/0126250 | A1 | 5/2013 | Ruth | |
| 2016/0114683 | A1 | 4/2016 | Bruce | |
| 2016/0219740 | A1 * | 7/2016 | Gehrke | H05K 5/023 |
| 2017/0225682 | A1 | 8/2017 | Schunk | |
| 2020/0060039 | A1 * | 2/2020 | De Carolis | G05B 19/0423 |
| 2020/0395691 | A1 * | 12/2020 | Stolze | H01R 9/2491 |
| 2023/0160177 | A1 * | 5/2023 | Strashny | B60L 5/36 439/34 |
| 2023/0162889 | A1 * | 5/2023 | Strashny | H01B 9/006 174/107 |
| 2023/0163506 | A1 * | 5/2023 | Strashny | H01R 13/2478 439/34 |
| 2023/0163507 | A1 * | 5/2023 | Strashny | B60L 5/38 439/34 |
| 2023/0163511 | A1 * | 5/2023 | Strashny | H01R 13/501 |
| 2023/0163512 | A1 * | 5/2023 | Strashny | H01R 13/501 |
| 2023/0163521 | A1 * | 5/2023 | Strashny | B60L 5/36 439/34 |
| 2023/0163526 | A1 * | 5/2023 | Strashny | B60L 5/32 439/34 |
| 2023/0202306 | A1 * | 6/2023 | Strashny | B60M 1/307 238/14.6 |
| 2023/0202348 | A1 * | 6/2023 | Strashny | B60M 1/02 104/2 |
| 2023/0203761 | A1 * | 6/2023 | Strashny | B60M 1/307 104/2 |
| 2023/0231349 | A1 * | 7/2023 | Strashny | B60L 5/085 191/45 R |
| 2023/0231350 | A1 | 7/2023 | Strashsny | |
| 2023/0391202 | A1 * | 12/2023 | Strashny | B60L 5/38 |
| 2023/0391225 | A1 * | 12/2023 | Lane | G01R 19/2513 |
| 2024/0001771 | A1 * | 1/2024 | Strashny | B60M 1/307 |
| 2024/0001772 | A1 * | 1/2024 | Strashny | B60M 1/307 |
| 2024/0006835 | A1 * | 1/2024 | Strashny | B60L 5/085 |
| 2024/0149717 | A1 * | 5/2024 | Hendrickson | B60L 50/53 |
| 2024/0157802 | A1 * | 5/2024 | Winckler | B60L 5/38 |
| 2024/0157851 | A1 * | 5/2024 | Strashny | B60M 1/08 |
| 2024/0157852 | A1 * | 5/2024 | Melchior | B60M 1/02 |
| 2024/0262210 | A1 * | 8/2024 | Strashny | B60L 5/39 |
| 2024/0282483 | A1 * | 8/2024 | Strashny | H01B 9/006 |
| 2025/0026242 | A1 * | 1/2025 | Strashny | B60M 1/02 |
| 2025/0026243 | A1 * | 1/2025 | Strashny | B60M 1/02 |
| 2025/0047079 | A1 * | 2/2025 | Strashny | H02B 1/52 |
| 2025/0125569 | A1 * | 4/2025 | Zhong | H02G 5/007 |
| 2025/0178442 | A1 * | 6/2025 | Strashny | B60L 53/35 |
| 2025/0178443 | A1 * | 6/2025 | Strashny | B60L 5/38 |
| 2025/0178444 | A1 * | 6/2025 | Strashny | B60L 5/08 |
| 2025/0178445 | A1 * | 6/2025 | Strashny | B60L 5/38 |
| 2025/0178485 | A1 * | 6/2025 | Strashny | B60L 5/40 |
| 2025/0179739 | A1 * | 6/2025 | Strashny | E01B 9/02 |
| 2025/0183565 | A1 * | 6/2025 | Strashny | B60M 1/30 |
| 2025/0242703 | A1 * | 7/2025 | Hendrickson | B60L 50/53 |
| 2025/0296446 | A1 * | 9/2025 | Strashny | B60L 5/38 |
| 2025/0376040 | A1 * | 12/2025 | Strashny | B60L 5/38 |
| 2025/0376048 | A1 * | 12/2025 | Strashny | B60L 50/53 |
| 2026/0054606 | A1 * | 2/2026 | Strashny | B60M 1/307 |

FOREIGN PATENT DOCUMENTS

| | | | | | |
|---|---|---|---|---|---|
| CN | 109440550 | A | * | 3/2019 | E01B 25/24 |
| CN | 114465027 | A | * | 5/2022 | H01R 9/26 |
| DE | 19710459 | A1 | * | 10/1997 | G02B 6/389 |
| FR | 3105116 | A1 | * | 6/2021 | B60L 53/32 |
| GB | 2526557 | A | * | 12/2015 | H01R 4/64 |
| KR | 20170011365 | A | | 2/2017 | |
| RU | 2368098 | C1 | * | 9/2009 | H01R 13/6585 |
| WO | WO-2015118074 | A1 | * | 8/2015 | B60M 1/24 |
| WO | WO-2018114690 | A1 | * | 6/2018 | H01B 7/009 |
| WO | WO-2018203883 | A1 | * | 11/2018 | H05K 7/1472 |
| WO | WO-2022247758 | A1 | * | 12/2022 | B60M 1/30 |

* cited by examiner 262
320
268
314
318
326
322
312
316
308
310
306
260
254
257
255
258
256
261
272
293
294
292
307
290
295
296
300
301
285
274
276
278
266
264
298
293
286
265
324
269
267
284
287
270
288
311
282
283
280
303
259
255
254
238

ELECTRICAL INTERFACE SYSTEM

TECHNICAL FIELD

The present disclosure relates generally to an electrical interface system for a mobile machine and, more specifically, a contactor assembly for engaging a conductive rail system.

BACKGROUND

Mobile industrial machines, such as earth-moving machines, can be of substantial weight and can bear immense loads, thus requiring a large amount of power. Many industrial machines are driven by internal combustion engines. However, internal combustion engines have drawbacks such as fuel costs, fuel transport difficulties, and detrimental engine emissions. Accordingly, there has been a movement toward powering large mobile industrial machines with hybrid or all-electric power systems.

While hybrid and all-electric power systems for industrial machines are beneficial for alleviating fuel costs and emission concerns, these systems present challenges. For example, the use of hybrid or all-electric systems in an industrial capacity requires a significant investment in infrastructure, particularly due to the location of industrial worksites. While the use of overhead electricity-conducting lines is one solution for powering vehicles with predetermined routes or terrain (e.g., trains, subways, buses, etc.), overhead lines are not practical for all machines or worksites, such as freely-steerable industrial machines and worksites with uneven terrain. As a result, existing power systems, such as overhead lines, are not typically used in remote and uneven environments and/or for variable routes. Further, it can be difficult to properly align and couple such power conducting lines to a machine for proper energy transfer. Such issues can lead to project delays and machine downtime.

A system for providing electric power to a traveling vehicle is described in International Patent App. Pub. No. WO 2020/186296 A1, published on Sep. 24, 2020 ("the '296 publication"). The system described in the '296 publication includes an electrical delivery system at a mine site for a moving vehicle where two electricity conductors are anchored to relocatable roadside barriers. In order to charge the moving vehicle, the delivery system provides an arm extending from the vehicle that aligns with electrical connectors embedded within a horizontal channel of the roadside barriers. While the system described in the '296 publication may be helpful in some circumstances, the interface connecting the roadside conductors to the vehicle may have drawbacks.

Aspects of the present disclosure may solve one or more of the problems set forth above and/or other problems in the art. The scope of the current disclosure, however, is defined by the attached claims, and not by the ability to solve any specific problem.

SUMMARY

In one aspect, a contactor assembly for connecting a mobile machine to a plurality of conductor rails includes: a base frame including a plurality of through holes; a plurality of conductor terminals each including a stationary piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal.

In another aspect, a contactor assembly for connecting a mobile machine to a plurality of conductor rails includes: a base frame including a plurality of through holes; a plurality of conductor terminals each including a stationary piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal, and the piston further including a tube fixed to an outer surface of piston, and a base plate fixed to a distal end surface of the piston.

In yet another aspect, a contactor assembly for connecting a mobile machine to a plurality of conductor rails includes: a base frame including a plurality of through holes; a plurality of conductor terminals each including a stationary piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal, and wherein each of the conductor terminals further includes a conductive fluid electrically coupling the stationary piston to the movable brush.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of +10% in the stated value.

As used herein, the terms "upstream" and "proximal" are intended to locationally identify components, parts, assemblies, and systems located closer to the frame/body of the mobile machine. Conversely, the terms "downstream" or "distal" are intended to locationally identify components, parts, assemblies, and systems located farther away from the frame/body of the mobile machine.

Figure 1:
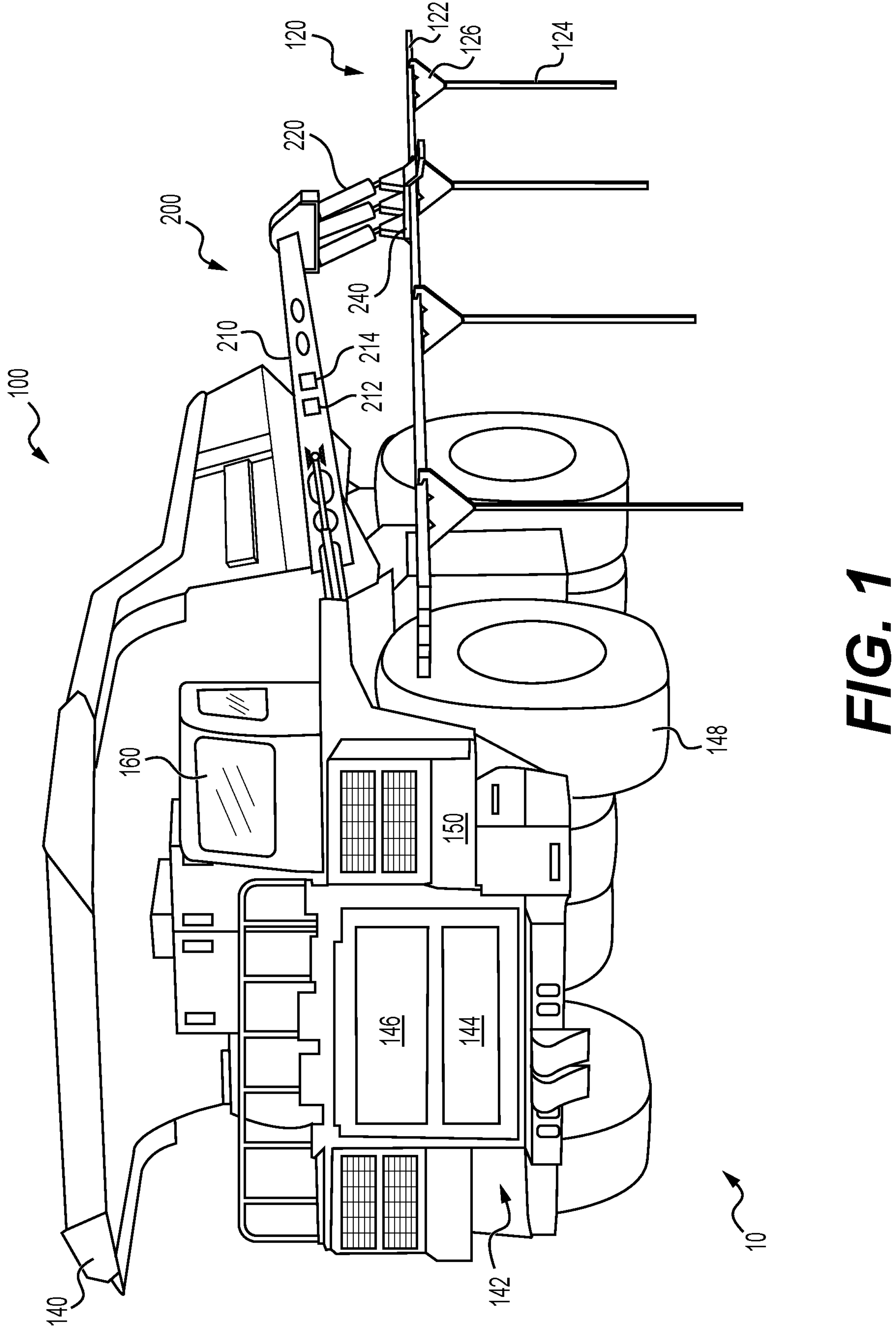
FIG. 1 is a perspective view of an electric mobile machine including a rail connector assembly for coupling with a conductive rail system, according to aspects of the present disclosure.

FIG. 1 depicts a mobile machine power system 100 including a mobile machine 140 having an electricity-conducting connector assembly 200, and an electricity-conducting rail system 120 for providing electric power to the mobile machine 140. The mobile machine 140 includes an electric drive system 142 having at least one electric motor 144 and at least one battery system 146. The electric drive system 142 drives a set of ground-engaging elements 148, such as tires or continuous tracks, for propelling and maneuvering the mobile machine 140. The mobile machine 140 also includes a frame/body 150 which supports the mobile machine's mechanical components, including the electricity-conducting connector assembly 200. Mobile machine 140 may include either a hybrid or an all-electric power system, and the electricity-conducting rail system 120 may be applied to either system. Mobile machine 140 and its various systems may be controlled via a machine operator located in the operator cabin 160, and/or mobile machine 140 may be semi- or fully-autonomous or remotely operated.

The mobile machine 140 is free-steering, allowing the operator of the machine (or autonomous control system) to freely control the direction and route of the machine. Thus, the exemplary mobile machine 140 is configured to travel (e.g., in a free-steering manner) selectively along a work route or path within a job site, with the electricity-conducting rail system 120 positioned generally along the route or path. The mobile machine 140 of FIG. 1 is shown in the context of a mining truck which is commonly used for transporting ore in a mine environment. The present disclosure is not so limited, however, and other types of machines are within the scope of the present disclosure, including articulated trucks, asphalt pavers, backhoe loaders, drills, rope shovels, excavators, forest machines, hydraulic mining shovels, material handlers, motor graders, off-highway trucks, pipelayers, road reclaimers, telehandlers, track loaders, underground mining dump loaders and trucks, wheel loaders, wheel tractor-scrapers, or other machines.

The electricity-conducting rail system 120 includes a plurality of elevated conductor rails 122 connected to a power source (e.g., a power grid, generator, and/or energy storage devices, not shown). The conductor rails 122 may be supported by a plurality of ground-engaging support poles 124 and rail bracket assemblies 126. While FIG. 1 shows an example where the plurality of conductor rails 122 contains three conductor rails, the plurality of conductor rails 122 may contain fewer or more rails. In this example, two of the conductor rails provide electrical power at different polarities (e.g., a conductor rail with a positive polarity and a conductor rail with a negative polarity) while the third conductor rail provides a reference of 0 volts (ground). The elevated conductor rails 122 may have a height, for example, in the range of 8 to 15 feet above the ground 10. Thus, the electricity-conducting rail system does not form a pantograph-type overhead power system, nor an under-machine or low-ground-located power system.

The electricity-conducting connector assembly 200 electrically connects the mobile machine 140 to the electricity-conducting rail system 120. The electricity-conducting connector assembly 200 includes a boom assembly 210 having a proximal end and a distal end; an arm assembly, such as a trailing arm assembly 220 having a proximal end connected to the distal end of the boom assembly 210; and a contactor assembly 240 connected to a distal end of the trailing arm assembly 220. As used herein, the term "trailing" refers to a direction opposite the forward direction of travel of the mobile machine 140. The boom assembly 210 houses a hydraulic system 212 for pivotably extending, retracting, and locking the boom assembly 210, and a pneumatic system 214 for generating and controlling fluid pressure of downstream components (e.g. the trailing arm assembly 220 and the contactor assembly 240), and an integrated busbar (not shown) for transferring electrical energy along a length of the boom assembly 210. While the disclosure below will provide details of pneumatic system 214, it is understood that the pneumatic system 214 could alternatively be a hydraulic system.

As shown in FIG. 1 the boom assembly 210 extends generally horizontally from a side of the mobile machine and is connected to a side of the frame/body 150 of the mobile machine 140 about a pivot joint. The pivot joint is located at a height of over 8 feet on the machine (above the ground 10). As previously referenced, the electricity-conducting connector assembly 200 includes several different states of deployment, including an extended state in which the boom assembly 210 is extended generally horizontally outward away from a side of the mobile machine 140 (as shown in FIG. 1), a retracted state (not shown) in which the boom assembly 210 is rotated or pivoted inward to rest against the frame/body 150 of the mobile machine (not shown), and a locked state in which the boom assembly is locked to the side of the machine frame/body 150 in the retracted state by a hydraulically-actuated locking pin (not shown). Finally, while the boom assembly 210 is shown to be attached to a mining truck, the same boom assembly 210 is capable of being incorporated in various types of mobile machines 140 by use of an interchangeable adapter (not shown) that is specific to the type of machine being operated.

The trailing arm assembly 220 forms a mechanical and electrical connection between boom assembly 210 and contactor assembly 240, and may include one or more arms. The one or more arms may be extendable and retractable and may have multiple degrees of freedom to allow for vertical and lateral pivoting about the boom assembly 210. In one arrangement, trailing arm assembly 220 may form a double parallel bar linkage including three telescoping arms that are configured to create a current path when in a fully-extended condition.

Figure 2:
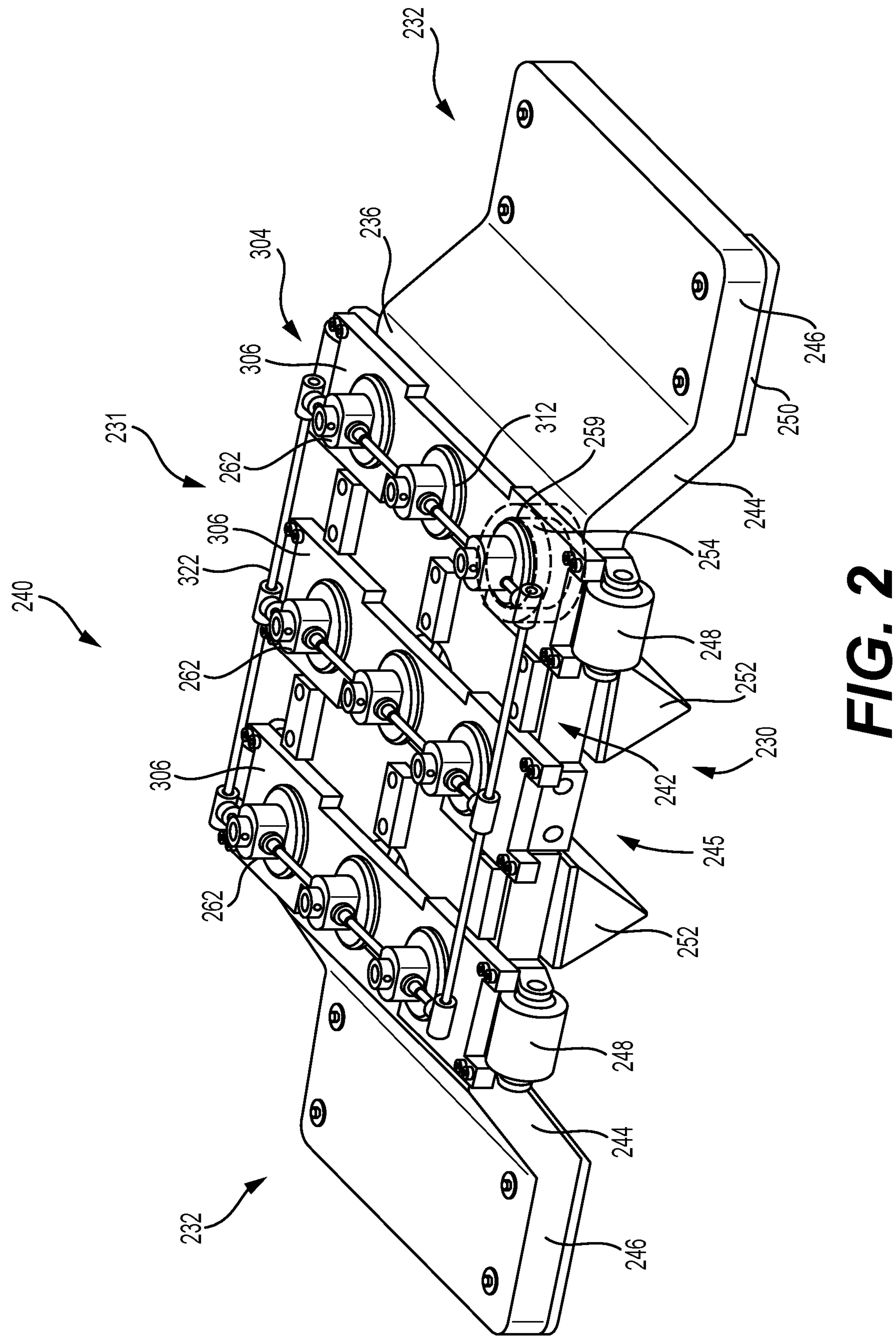
FIG. 2 is a perspective view of a contactor assembly of the rail connector assembly.
Figure 3:
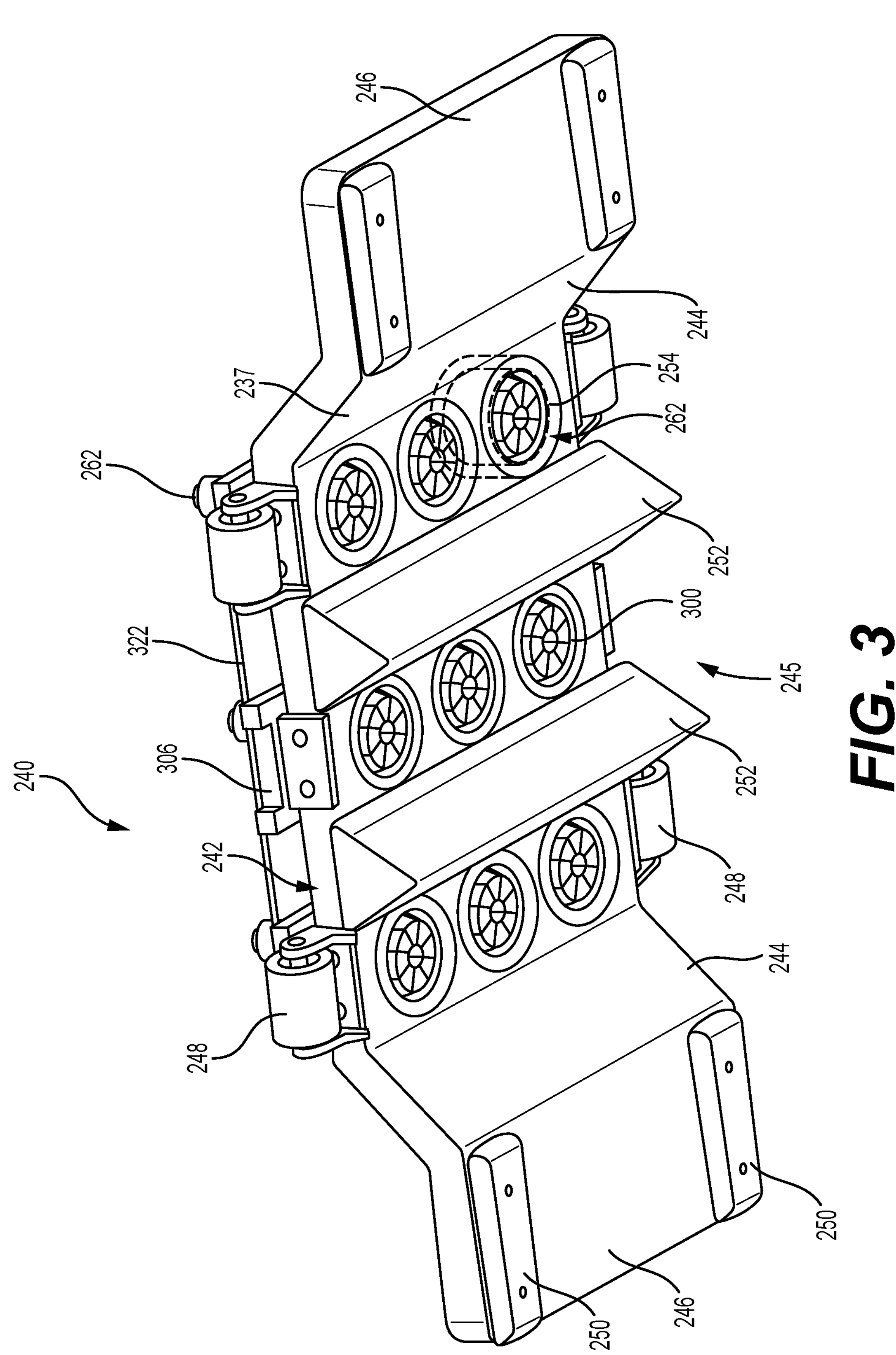
FIG. 3 is a bottom view of the contactor assembly of FIGS. 1 and 2.

As shown in FIGS. 2 and 3, the contactor assembly 240 electrically interfaces with the electricity-conducting rail system 120 and includes a base frame 242, a plurality of conductor terminals 262, a plurality of busbars assembly 306, and rail interface features. The base frame 242 includes a composite structure including an upper skin layer 236, a bottom skin layer 237, and a high-density foam material 238 (FIG. 4) sandwiched between the two skin layers. Both the upper and bottom skin layers 236, 237 may be made of multiple layers of a resin-reinforced material or fabric, such as fiberglass or other electrically-insulating materials. The base frame 242 may be formed using various composite fabrication techniques, such as vacuum-assisted resin transfer molding, in order to develop a composite structure that is lightweight and substantially rigid.

The composite structure of the base frame 242 includes a top side 230, a bottom side 231 shown in FIGS. 2 and 3, respectively. The base frame 242 further includes a central platform 304, and a pair of opposing lateral sides 232. In FIG. 2, each of the opposing lateral sides 232 include a lateral strut 244 that extends outward from central platform 304 at a downward angle, and a pair of lateral flanges or wings 246. The pair of lateral flanges 246 are located on a distal end of each of the lateral struts 244, with the lateral flanges arranged to be substantially parallel to the central platform 304 of the base frame 242. The lateral flanges 246 are configured to assist in positioning and retaining the plurality of conductor rails 122 within the pair of lateral struts 244 by preventing excessive lateral movement of the conductor rails 122 relative to a bottom surface of the base frame 242.

The plurality of rail interface features coupled to the base frame 242 may include a plurality of support rollers 248, a plurality of wear pads 250, and a plurality of separation bumpers 252. To aid the base frame 242 in sliding along the plurality of conductor rails 122, a plurality of support rollers 248 are attached to a front side and rear side of the base frame 242 (see FIGS. 2 and 3). The plurality of wear pads 250 may be attached to a bottom side 231 of base frame 242 at the lateral flanges 246 (See FIG. 3). The plurality of separation bumpers 252 are attached to bottom side 231 of the base frame 242 in a spaced configuration to align with gaps between the plurality of conductor rails 122. The separation bumpers 252 assist in reducing excessive lateral movement of the base frame 242 when riding on the conductor rails 122. The separation bumpers 252 may be triangular-shaped bars as shown in FIG. 3, but may vary in size and shape based on the characteristics of the base frame 242, and in accordance with the spacing of the plurality of conductor rails 122.

The central platform 304 of base frame 242 includes a plurality of through holes 254 extending vertically therethrough. Each of the through holes 254 receive a corresponding conducting terminal 262 and an annular magnet chamber 259. As shown in FIGS. 2 and 3, central platform 304 includes nine through holes 254 arranged in a three-by-three matrix, such that three groups of linearly-aligned through holes 254, and corresponding conducting terminals 262, correspond to each of three busbars 306 and conductor rails 122. More or less conducting terminals 262 may be used, such as only three, six, or twelve conducting terminals 262. While one through hole 254, conducting terminal 262, and associated features will be discussed below, the description will equally apply to the other through holes 252, conducting terminals 262 and associated features.

Figure 4:
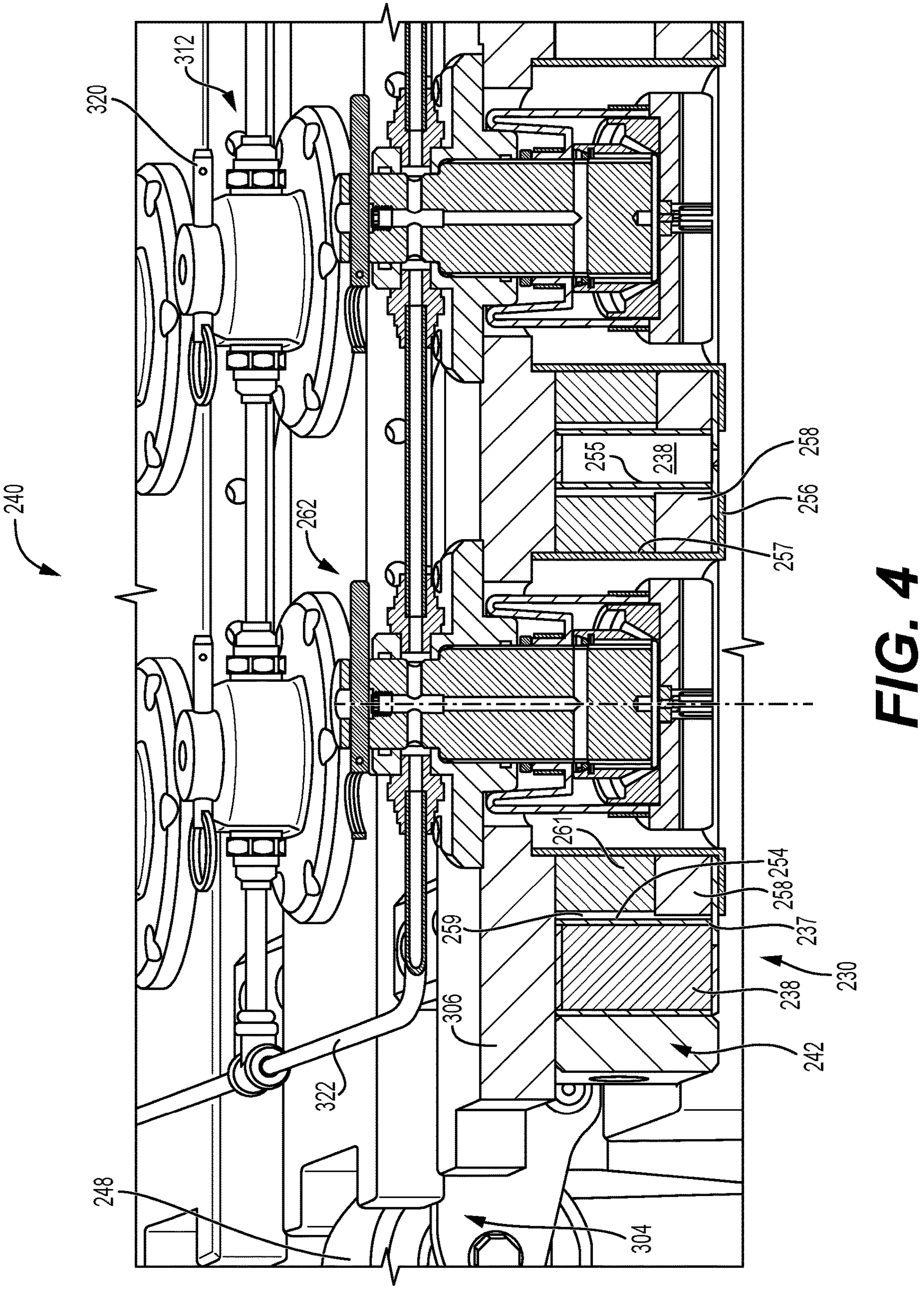
FIG. 4 is a cross-sectional view of a section of the contactor assembly.
Figure 5:
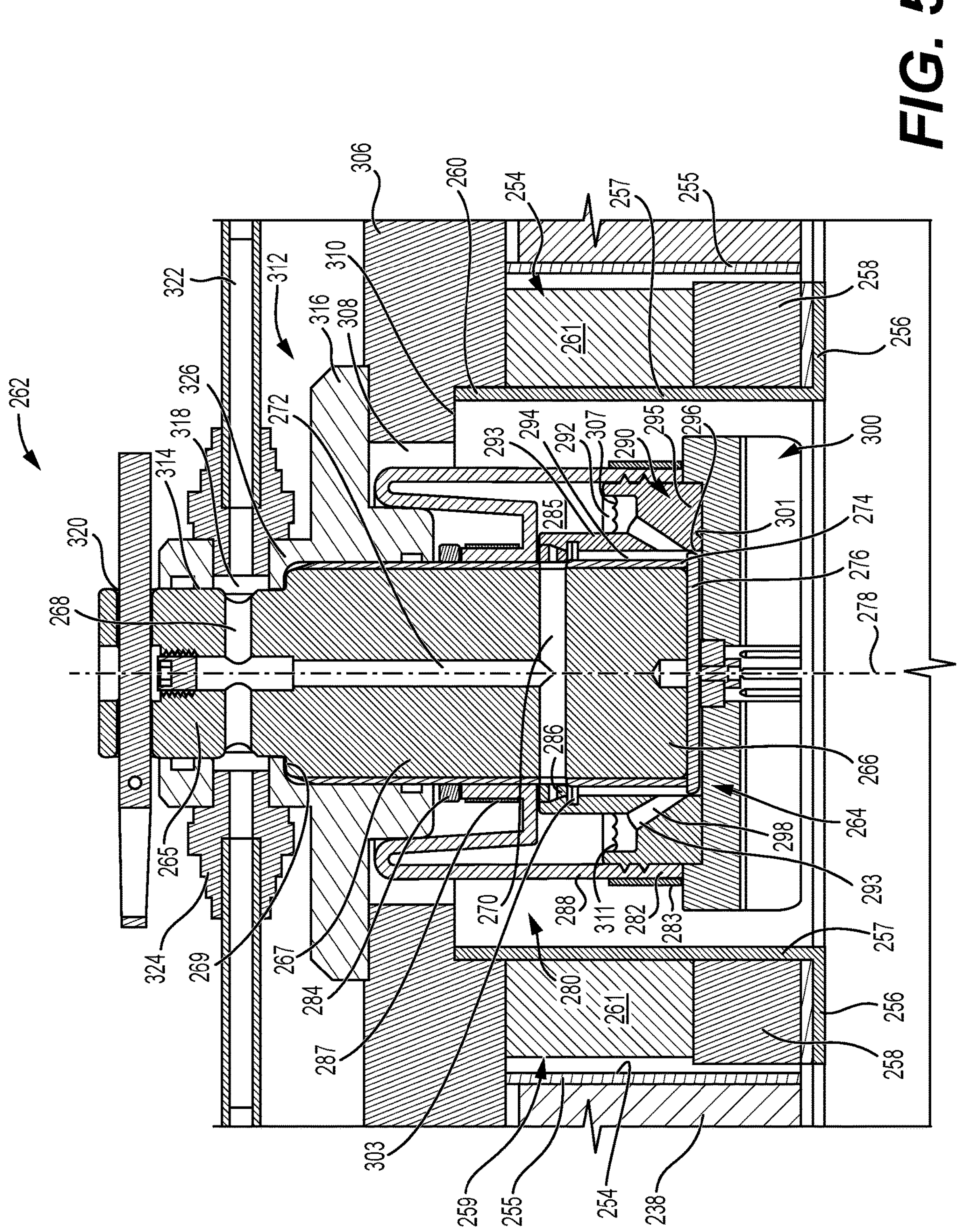
FIG. 5 is a cross-sectional view of an individual conductor terminal of the contactor assembly.

Referring to FIGS. 4 and 5, each of the through holes 254 in base frame 242 may receive a radially-outer tubular member 255 and a radially-inner tubular member 257 together forming the annular magnet chamber 259 therebetween. The tubular members 255, 257 may be secured to the central platform 304 in any appropriate manner, such as with adhesives. In one example, the radially-inner tubular member 257 may include a radially-outwardly extending distal flange 256 at the bottom side 231 of the base frame 242 to assist in securing the tubular member to the bottom skin layer 237 of the base frame 242. The annular magnet chamber 259 houses a magnet assembly including a plurality of magnets 258 arranged circumferentially within magnet chamber 259. The plurality of magnets 258 are thus housed within the base frame 242 and aid in connecting the base frame to the plurality of conductor rails 122 of the electricity-conducting rail system 120. An annular foam insert 261 may also be located in annular magnet chamber 259 above the plurality of magnets 258. The radially-inner tubular member 257 may include a top or proximal portion 260 that extends beyond a top surface of the base frame 242 to allow for a mating engagement with an annular cutout portion 310 formed in an underside of the busbar assembly 306. The tubular members 255, 257 may be made of any appropriate dielectric material, such as fiberglass or other similarly electrically-insulating materials.

Referring to FIG. 5, each conductor terminal 262 may include a piston assembly 264, a fluid bag or airbag assembly 280, and an individual extendable brush 300. The piston assembly 264 includes a piston 266, a cylindrical outer tube 274, and a bottom base plate 276. The piston 266 may include a plurality of pneumatic channels 268, 270, 272 that are fluidly interconnected for directing pressurized fluid throughout the individual conductor terminal 262. For example, the piston 266 may include: a first pneumatic channel 268 that extends horizontally through a first, proximal end of a body of the piston; a second pneumatic channel 270 that extends horizontally through the body of the piston at a mid-portion of the piston; and a third pneumatic channel 272 that extends vertically and connects the first and second pneumatic channel 268, 270. The piston 266 may have a generally cylindrical shape with top or proximal portion 265 having a smaller diameter than a bottom or distal portion 267, and a horizontal step 269 between the proximal and distal portions 265, 267. Piston 266 may be made of any electrically conductive material, such as an aluminum alloy or other similar materials or alloys. In addition to the piston 266, the cylindrical outer tube 274 is hollow with multiple through holes that correspond with the second pneumatic channel 270 and is sized such that the piston 266 is secured within the cylindrical outer tube 274 via a press fit interference. The bottom base plate 276 is secured to a bottom surface of the distal portion 267 of the piston 266 via friction welding. The bottom base plate 276 may have a larger diameter than the distal portion 267 of piston 266 and of cylindrical outer tube 274. Both the cylindrical outer tube 274 and the bottom base plate 276 may be made of any corrosion-resistant metal material, such as a stainless steel alloy or other similar materials.

Figure 6:
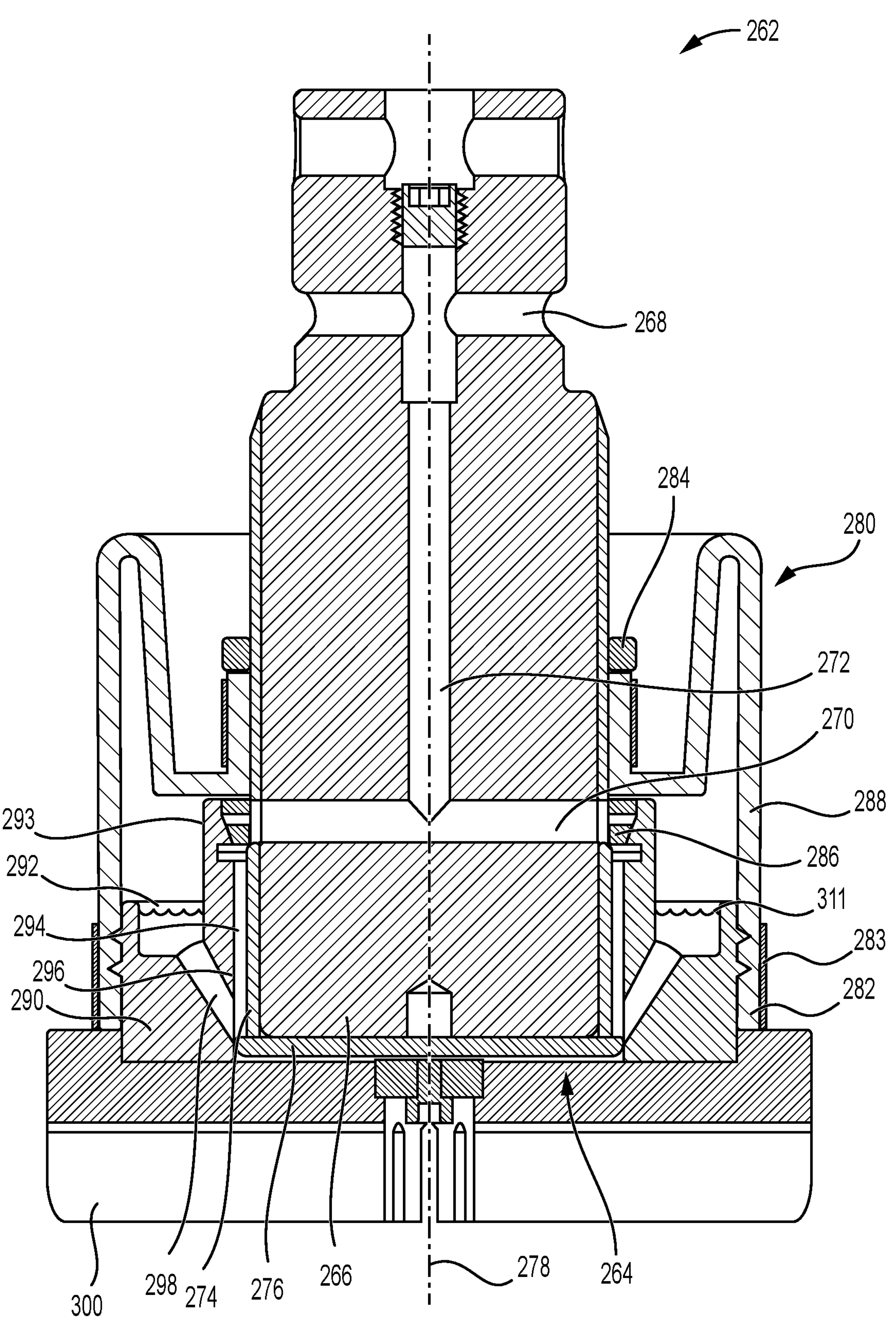
FIG. 6 is a cross-sectional view of the individual conductor terminal in a retracted configuration.

The airbag assembly 280 includes an airbag 288, an airbag chamber 285 and a reservoir forming hub 290. As noted above, the airbag assembly 280 could alternatively be used with a fluid other than air, such as a fluid bag assembly using hydraulic fluid. The airbag 288 may have a substantially tubular or bulbous shape and may be formed of one or more layers of a compressible material, such as rubber. A top or proximal portion of the airbag 288 is fixedly secured to an outer diameter of the piston assembly 264 between a first attachment point (via a first, fixed locating ring 284) and a second attachment point (via a second, fixed locating ring 286), with a first ring clamp 287. Both the first locating ring 284 and the second locating ring 286 may be snap rings or other suitable fixed fastening means, with the second locating ring 286 including a tapered shape that mates within an inner surface of an upper wall 293 of reservoir forming hub 290. The second locating ring 286 is aligned with the second pneumatic channel 270 of the piston assembly 264, and includes a plurality of holes to allow pressurized fluid to travel from the second pneumatic channel to the airbag chamber 285. Additionally, the airbag 288 also includes a distal or bottom portion 282 that is fixedly secured (via a second ring clamp 283) to an external circumferential surface of the reservoir forming hub 290. As best shown in the airbag movement of FIGS. 6 and 7, the airbag chamber 285 can be supplied with air to extend the reservoir forming hub distally along the piston assembly 264 to extend the extendable brush 300 distally along a longitudinal axis 278. The movement of the airbag 288 radially when supplied with air from pneumatic system 214 may be constrained by the stiffness of the airbag, the radially-inner tubular member 257, and/or walls of the busbar assembly 306 and an upper or proximal cap 312.

Figure 7:
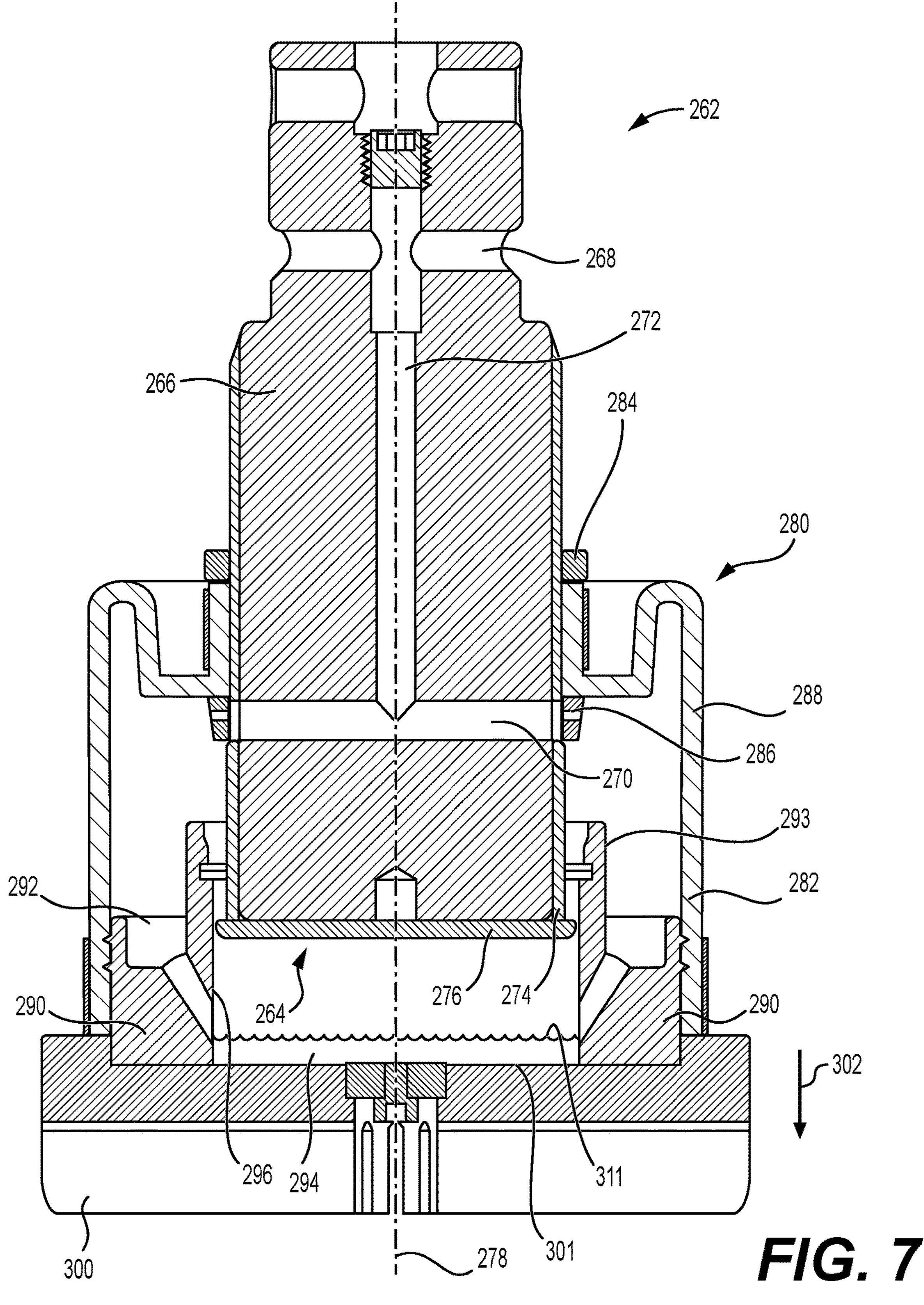
FIG. 7 is a cross-sectional view of the individual conductor terminal in an extended configuration.

The reservoir forming hub 290 is a ring member having the proximal or upper wall 293 and a distal or bottom base 295. A bottom or distal end of base 295 of reservoir forming hub 290 is fixedly secured to a top or proximal surface 301 of the extendable brush 300 in any appropriate manner. Upper wall 293 may include one or more piston rings 303 to facilitate movement of the reservoir forming hub 290 along the piston assembly 264 during extension and retraction of the extendable brush 300. The reservoir forming hub 290 extends circumferentially around the piston assembly 264 and forms an internal chamber 294 and a reservoir chamber 292. The internal chamber 294 is best shown in FIG. 7 and is formed by a gap between the piston assembly 264, the upper wall 296 of reservoir forming hub 290 and a top surface 301 of the extendable brush 300. The reservoir chamber 292 of the reservoir forming hub 290 is formed by an annular channel 307 in a top surface of the bottom base 295 of the reservoir forming hub 290. The reservoir chamber 292 is fluidly connected to the internal chamber 294 by a plurality of angled connecting passages 298. The internal chamber 294 includes a conductive fluid 311 to facilitate an electrical connection between the piston assembly 264 and the extendable brush 300 as the extendable brush is extended and retracted with respect to the stationary piston assembly 264. The reservoir chamber 292 is configured to receive excess conductive fluid 311 during movement of the extendable brush 300, and associated volume changes in the internal chamber 294. Thus, the piston assembly 264, the extendable brush 300, and the reservoir forming hub 290 together form a reservoir for conductive fluid. Reservoir chamber 292 may receive conductive fluid 311 when the extendable brush 300 approaches the retracted position (FIG. 6) and is drained of conductive fluid 311 when the extendable brush 300 approaches a fully-extended position (FIG. 7). The reservoir forming hub 290 may be made of a corrosion-resistant material, such as stainless steel, ceramic, or other similar materials. The conductive fluid 311 may be any flowable conductive material that is liquid at room temperature, such as gallium-based or mercury-based liquid metal alloys.

Referring back to FIG. 5 and the enlarged view of an individual conductor terminal 262 with piston assembly 264, airbag assembly 280, and the extendable brush 300. As noted above, the extendable brushes 300 are housed within the base frame 242 and include multiple states of extension or retraction based on the amount of pressurized fluid (e.g., air) present in the airbags chamber 285. For example, the different states of extension or retraction may include a fully retracted state (FIGS. 4-5) in which the extendable brushes 300 are fully retracted within the contactor assembly 240 while the pressurized fluid of the contactor assembly is vented into the atmosphere; an operating state (not shown) in which the extendable brushes are slightly extended to contact the top surface of the conductor rails 122 during attachment; and a fully-extended state (FIG. 7) in which the extendable brushes are extend to their maximum length. In the fully retracted state, the pressure of fluid in the airbag chamber 285 is insufficient to overcome the preset shape of the airbag 288, and thus the airbag urges the extendable brush 300 into the fully-retracted state. In the operating state, the bottom surface of the plurality of extendable brush 300 slightly extends from the base frame 242 and is configured to slide along the top surface of the plurality of conductor rails 122 to collect electrical energy. For example, the extendable brush 300 conducts electrical energy from the plurality of conducting rails 122, through a body of the extendable brush to the piston assembly 264 via the conductive fluid 298. It is noted that the conductive fluid 311 is in fluid communication with the airbag chamber 285.

When in the fully extended state, the extendable brush 300, due to the expansion of the airbag 288, extends in a downward direction from the bottom surface of the base frame 242 towards the top surface of the plurality of conductor rails 122 with a pneumatic extending force 302 directed in the same downward direction of extension (shown in FIG. 7). In the fully-extended state, the extendable brushes 300 serve to push the contactor assembly 240 away from the conductor rails 122 sufficiently to overcome the magnetic force of the plurality of magnets 258. In this fully-extended state, the conductive fluid may be disconnected from the piston assembly 264 (as shown in FIG. 7). The plurality of extendable brushes 300 may be comprised of carbon-based or metal-based composite materials. For example, a graphite-based composite material may be used. As shown in exemplary FIG. 5, the individual extendable brush 300 is generally disk-shaped and are sized to fit within the through hole 254 formed in the base frame 242. Further, the extendable brushes 300 of contactor assembly 240 together lie in a common plane for contacting a top surface of the plurality of conducting rails 122.

Referring again to FIG. 5, each conductor terminal 262 is removably secured to the central platform 304 of base frame 242, the busbar assembly 306, and a proximal cap 312, by a pin connector 320. In the arrangement shown, the pin connector 320 forms the sole or only connector for removably connecting the conductor terminals 262 to the contactor assembly 240 and extends horizontally through the top portion 265 of the piston 266. To remove the conductor terminal 262, the pin connector 320 is withdrawn from the top portion 265 and the conductor terminal 262 is pushed distally free of the proximal cap 312 and the individual through hole 254 of the base frame 242. The busbar assembly 306 is mounted to the upper skin layer 236 of the base frame 242 and includes a plurality of terminal or through holes 308 for receiving a top portion 265 of the piston assembly 264. As will be explained in more detail below, the busbar assembly 306 may be made of any electrically conductive material, such as aluminum, copper, brass, or other similar materials. Each of the busbar assemblies 306 are generally rectangular in shape and the plurality of through holes 308 extends vertically there through. As discussed above, the busbar assembly 306 includes a plurality of annular cutout portions 310 on a bottom surface of the busbar assembly 306 that surround each of the through holes 308. The annular cutout portions 310 thus form a step for receiving the top portions 260 of the radially-inner tubular members 257. The terminal or through holes 308 thus align with the individual conductor terminals 262, and align the busbar assembly 306 to the upper skin layer 236 of the base frame 242. The plurality of through holes 308 are also sized to receive the conductor terminals 262 extending therethrough. The busbar assemblies 306 may be affixed to the upper skin layer 236 of the base frame 242 by the application of an adhesive, without the use of additional mechanical fasteners. However, mechanical fasteners may be additionally or alternatively included for coupling and locating purposes.

Each of the plurality of through holes 308 of the plurality of busbar assemblies 306 includes an individual proximal cap 312 that effectively fixes an individual conductor terminal 262 within the base frame 242. As shown in FIG. 5, the proximal cap 312 may include a generally annular and tubular shape with an annular opening 314 extending through the proximal cap, an internal retaining flange or step 326, and an external retaining flange 316 encircling a middle portion of the piston assembly 264. The annular opening 314 is shaped to receive a top portion of the piston assembly 264 such that the internal retaining flange 326 abuts with the horizontal step 269 in the piston 266 separating the smaller diameter proximal end of the piston 266 from the distal, larger-diameter portion 267 of piston 266. The proximal or top portion of cap 312 includes pneumatic passages 318 aligned with the first pneumatic channel 268 of the piston 266. The pneumatic passages 318 may include fittings 324 for connecting to pneumatic supply conduits 322. The pneumatic passages 318 and the pneumatic supply conduits 322 assist in conveying pressurized fluid to and from airbag chambers 285 during brush extension and retraction. The external retaining flange 316 includes a bottom surface, which is placed onto the top surface of the busbar 306 and completely covers the individual through hole 308. In FIGS. 4 and 5, the proximal cap 312 also includes a lower end portion that is located beneath the external retaining flange 316 and located within the individual through hole 308 of the busbar assembly 306. In operation, the lower end portion of the proximal cap 312 may contact the airbag 288 prior to and during expansion. The external retaining flange 316 includes a plurality of fastener holes for attaching the flange to the busbar assembly 306 with a plurality of mechanical fasteners.

INDUSTRIAL APPLICABILITY

The disclosed aspects of the contactor assembly above can be used for electrically connecting to an electricity-conducting rail system, the contactor assembly sliding along the electricity-conducting rail system for charging a free-steering mobile machine while operating on a worksite, and the contactor assembly disengaging from the electricity-conducting rail system. For example, the drawings generally depict the contactor assembly, located at a distal end of an electricity-conducting connector assembly, including a plurality of conducting terminals for collecting electrical energy retained within a base frame and a busbar assembly attached to the base frame by a plurality of top portions of a plurality of radially-inner tubular members.

In order to operate the mobile machine 140, the mobile machine is controlled by an operator in the operator cabin 160, remotely, or autonomously. Upon approaching the electricity-conducting rail system 120, the electricity-conducting connector assembly 200, including a boom assembly 210, a trailing arm assembly 220, and the contactor assembly 240 is deployed and attached to a plurality of conductor rails 122, as shown in FIG. 1. The contactor assembly 240 is attached to the plurality of conductor rails 122 by two means. First, a base frame 242 of the contactor assembly 240 includes a plurality of magnets 258 (shown in FIGS. 4 and 5, where the plurality of magnets extend circumferentially around a plurality of conductor terminals 262) that generate a downward magnetic force towards the plurality of conductor rails 122. Additionally, a mass of the contactor assembly 240 generates a gravitational force of mass, which also encourages engagement of the contactor assembly with the plurality of conductor rails 122. While the downward magnetic force and the gravitation force of mass aid in attaching the contactor assembly 240 to the plurality of conductor rails 122, the contactor assembly 240 also includes a plurality of rail interface features for maintaining its connection with the rails, as discussed above.

While in this engaged state, the extendable brushes 300 of contactor assembly 240 are partially extended from their fully retracted state, and slide along the conductor rails 122 and transfer electrical energy from the conductor rails 122 to the mobile machine 140. Each row of the three rows of conductor terminals 262 and the busbar assemblies 306 electrically connect to an individual conductor rail 122 forming a positive electrical connection, negative electrical connection, and a neutral or ground connection. To help properly connect and maintain connection with the conductor rails 122, the contactor assembly 240 may use a pair of lateral flanges or wings 246, a plurality of support rollers 248, a plurality of wear pads 250, and a plurality of separation bumpers 252, as shown in FIGS. 2 and 3.

During the connection in the engaged state, electrical energy from the plurality of conductor rails 122 travels through the plurality of extendable brushes 262 to the conductive fluid 311 (shown in FIG. 5). From the conductive fluid 311, the electrical energy is transferred to the piston 266 (via a cylindrical outer tube 274 and a bottom base plate 276). The piston 266 conveys the electrical energy along its length to the proximal cap 312. The electrical energy may then be transmitted to the plurality of busbar assemblies 306, which are connected to the upstream components of the electricity-conducting connector assembly 200 (e.g., the trailing arm assembly 220 and the boom assembly 210).

Once a disengagement procedure has been initiated by the operator, a pneumatic system 214 generates a pneumatic extending force 302 capable of extending a plurality of extendable brushes 300. As noted above, the pneumatic system 214 in the boom assembly 210 can be controlled to pressurize fluid for the downstream components of the electricity-conducting connector assembly 200. The pressurized fluid is conveyed from the pneumatic system 214 of the boom assembly 210 to a pneumatic supply conduit 322. The pneumatic supply conduit 322 is fluidly connected to a plurality of conductor terminals 262, which each include a piston assembly 264. The piston assembly 264 includes a piston 266 and a plurality of pneumatic channels 268, 270, 272 that internally connect the pneumatic supply conduit 322 to an airbag assembly 280, which contains the pressurized fluid within the airbag chamber 285.

Once sufficient pressurized fluid fills an airbag chamber 285 of the airbag assembly 280, the reservoir forming hub 290 toward the fully-extended state (shown in FIG. 7). This expansion actuates the plurality of extendable brushes 300, which extend in a downward direction and against a top surface of the conductor rails 122. The pneumatic extending force 302 is directed along the same downward direction towards a top surface of the conductor rails 122. The contactor assembly 240 may disengage from the plurality of conductor rails 122 in an instance where the pneumatic extending force 302 exerted by the plurality of extendable brushes 300 is greater than a combined force including the downward magnetic force and the gravitational force of mass acting on the contactor assembly. The electricity-conducting connector assembly 200 may then complete the disengagement routine or attempt to reconnect with the plurality of conductor rails 122 to continuing charging the mobile machine 140.

In accordance with the present disclosure, a contactor assembly for a mobile machine allows for a rail connector assembly to securely attach to, slide along, and safely disengage from a plurality of conducting rails using a pneumatic system that is fluidly connected to a piston assembly. The contactor assembly also utilizes a plurality of annular recesses that extend from a bottom skin layer of a base frame and protrude from an upper skin layer of the base frame, allowing for a plurality of machined busbars to be positioned and matingly connected with the annular protrusions, without the need for mechanical fasteners. Finally, the contactor assembly of the present invention provides for a pneumatic pin connection interface for retaining a conductor terminal within an annular recess and allowing for the quick replacement of conductor terminals as necessary.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A contactor assembly for connecting a mobile machine to a plurality of conductor rails, the contactor assembly comprising:

a base frame including a plurality of through holes;

a plurality of conductor terminals each including a piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal.

2. The contactor assembly of claim 1, wherein each of the individual conductor terminals are removably secured to the contactor assembly by a single connector.

3. The contactor assembly of claim 2, wherein the single connector is a pin connector.

4. The contactor assembly of claim 3, wherein a top portion of the piston includes a pin hole for receiving the pin connector.

5. The contactor assembly of claim 4, further including a cap associated with each conductor terminal, the cap being secured to a top of an associated busbar and including a passage for receiving the top portion of the piston, and the pin connector abuts a top surface of the cap when the conductor terminal is secured to the contactor assembly.

6. The contactor assembly of claim 5, wherein the cap includes a step mating with a step of the piston when the conductor terminal is secured to the contactor assembly.

7. The contactor assembly of claim 1, wherein the fluid bag assembly is an airbag assembly, and the airbag assembly moves the brush between extended and retracted positions.

8. The contactor assembly of claim 7, wherein the piston includes a plurality of pneumatic channels extending through a body of the piston to communicate air to and from an airbag chamber of the airbag assembly.

9. The contactor assembly of claim 7, wherein the airbag assembly includes an airbag having a proximal end and a distal end, and the airbag is fixedly coupled to the piston at the proximal end, and fixedly connected to a movable hub at the distal end.

10. The contactor assembly of claim 9, further including a movable hub surrounding the piston, and wherein the piston assembly, movable brush and movable hub form a reservoir for conductive fluid.

11. The contactor assembly of claim 1, wherein each of the conductor terminals further includes a conductive fluid electrically coupling the piston to the movable brush.

12. The contactor assembly of claim 11, further including a tube and base plate coupled to the piston, the tube and base plate located for contacting the conductive fluid.

13. The contactor assembly of claim 1, wherein the contactor assembly is coupled to an arm assembly and boom assembly for electrically connecting the mobile machine to the plurality of conducting rails.

14. The contactor assembly of claim 1 wherein the distal end surfaces of the movable brushes together lie in a common plane for contacting a top surface of the plurality of conducting rails.

15. A contactor assembly for connecting a mobile machine to a plurality of conductor rails, the contactor assembly comprising:

a base frame including a plurality of through holes;

a plurality of conductor terminals each including a piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal, and the piston further including a tube fixed to an outer surface of piston, and a base plate fixed to a distal end surface of the piston.

16. The contactor assembly of claim 15, wherein the base plate is friction welded to the distal end surface of the piston.

17. The contactor assembly of claim 16, wherein the tube and base plate are connected together at a distal end portion of the piston.

18. A contactor assembly for connecting a mobile machine to a plurality of conductor rails, the contactor assembly comprising:

a base frame including a plurality of through holes;

a plurality of conductor terminals each including a piston, a fluid bag assembly, and a movable brush; and a plurality of busbars each including at least one terminal hole aligned with at least one through hole of the base frame, wherein each of the plurality of through holes and aligned terminal holes receive a portion of an individual conductor terminal, and wherein each of the conductor terminals further includes a conductive fluid electrically coupling the piston to the movable brush.

19. The contactor assembly of claim 18, further including a movable hub surrounding the piston, and the piston assembly, movable brush and movable hub form a reservoir for the conductive fluid.

20. The contactor assembly of claim 19, wherein the reservoir for the conductive fluid is in fluid communication with a fluid chamber of the fluid bag assembly.

* * * * *